(12) United States Patent
Gojkovic et al.

(10) Patent No.: US 10,803,469 B2
(45) Date of Patent: Oct. 13, 2020

(54) LOYALTY REWARDS MANAGEMENT AND PROCESSING SYSTEM AND METHOD

(75) Inventors: Mirko Gojkovic, North York (CA); Daryl Colin Halliday, Toronto (CA); Nenad Stojanovic, North York (CA)

(73) Assignee: VALUECENTRIC MARKETING GROUP, INC., Binghamton, NY (US)

( * ) Notice: Subject to any disclaimer, the term of this patent is extended or adjusted under 35 U.S.C. 154(b) by 2386 days.

(21) Appl. No.: 11/785,435

(22) Filed: Apr. 18, 2007

(65) Prior Publication Data

US 2008/0262915 A1    Oct. 23, 2008

(51) Int. Cl.
*G06Q 30/00* (2012.01)
*G06Q 30/02* (2012.01)

(52) U.S. Cl.
CPC ......... *G06Q 30/02* (2013.01); *G06Q 30/0224* (2013.01); *G06Q 30/0226* (2013.01); *G06Q 30/0236* (2013.01); *G06Q 30/0239* (2013.01)

(58) Field of Classification Search
CPC .................................. G06Q 30/0207–30/0239
See application file for complete search history.

(56) References Cited

U.S. PATENT DOCUMENTS

| 5,056,019 A | 10/1991 | Schultz et al. |
| 5,774,870 A | 6/1998 | Storey |
| 5,923,016 A | 7/1999 | Fredregill et al. |
| 5,945,653 A | 8/1999 | Walker et al. |
| 5,991,376 A | 11/1999 | Hennessy et al. |
| 6,009,412 A | 12/1999 | Storey |
| 6,009,415 A | 12/1999 | Shurling et al. |
| 6,024,288 A | 2/2000 | Gottlich et al. |
| 6,026,370 A | 2/2000 | Jermyn |

(Continued)

FOREIGN PATENT DOCUMENTS

WO    WO-9926176 A1 *    5/1999    ......... G06Q 30/0236

OTHER PUBLICATIONS

Speedway SpeedyRewards http://www.speedway.com/SpeedyRewards/.
(Continued)

*Primary Examiner* — Michael Bekerman
(74) *Attorney, Agent, or Firm* — Finnegan, Henderson, Farabow, Garrett & Dunner LLP

(57) ABSTRACT

A system and method for processing a transaction in connection with a loyalty rewards program comprising identifying at least one individual associated with said transaction, communicating associated information to a processing component that includes rules and logic associated with said loyalty rewards program, determining an eligible amount associated with said transaction for at least one promotion, determining at least one reward based on said eligible amount and said at least one promotion, and storing detailed, comprehensive, line item information associated with the transaction. Said system and method may further comprise determining an owed amount associated with at least one loyalty provider based on said rules and logic and charging said at least one loyalty provider for said owed amount. Such a system will facilitate marketing strategies, processing of returns, and management of cross-promotional arrangements, and will enable merchants to develop, implement, and manage complex loyalty rewards programs.

35 Claims, 8 Drawing Sheets

(56) References Cited

U.S. PATENT DOCUMENTS

| | | | |
|---|---|---|---|
| 6,039,244 A | 3/2000 | Finsterwald | |
| 6,055,573 A | 4/2000 | Gardenswartz et al. | |
| 6,061,660 A | 5/2000 | Eggleston et al. | |
| 6,070,147 A | 5/2000 | Harms et al. | |
| 6,119,933 A | 9/2000 | Wong et al. | |
| 6,138,911 A | 10/2000 | Fredregill et al. | |
| 6,345,261 B1 | 2/2002 | Feidelson et al. | |
| 6,415,261 B1 | 7/2002 | Cybul et al. | |
| 6,424,951 B1 | 7/2002 | Shurling et al. | |
| 6,549,912 B1 | 4/2003 | Chen | |
| 6,564,189 B1 | 5/2003 | Nycz | |
| 6,571,216 B1 | 5/2003 | Garg et al. | |
| 6,578,012 B1 | 6/2003 | Storey | |
| 6,594,640 B1 | 7/2003 | Postrel | |
| 6,671,358 B1 | 12/2003 | Seidman et al. | |
| 6,672,507 B1 | 1/2004 | Walker et al. | |
| 6,694,300 B1 | 2/2004 | Walker et al. | |
| 6,795,809 B2 | 9/2004 | O'Brien et al. | |
| 6,808,111 B2 | 10/2004 | Kashef et al. | |
| 6,820,061 B2 | 11/2004 | Postrel | |
| 6,829,586 B2 | 12/2004 | Postrel | |
| 6,842,739 B2 | 1/2005 | Postrel | |
| 6,886,000 B1 | 4/2005 | Aggarwal et al. | |
| 6,889,198 B2* | 5/2005 | Kawan | 705/14.27 |
| 6,907,400 B1 | 6/2005 | Matsko et al. | |
| 6,915,271 B1 | 7/2005 | Meyer et al. | |
| 6,920,611 B1 | 7/2005 | Spaeth et al. | |
| 6,934,684 B2 | 8/2005 | Alpdemir et al. | |
| 6,947,898 B2 | 9/2005 | Postrel | |
| 6,965,868 B1 | 11/2005 | Bednarek | |
| 6,978,270 B1 | 12/2005 | Carty et al. | |
| 6,980,670 B1 | 12/2005 | Hoffman et al. | |
| 6,980,962 B1 | 12/2005 | Arganbright et al. | |
| 7,090,138 B2 | 8/2006 | Rettenmyer et al. | |
| 7,096,190 B2 | 8/2006 | Postrel | |
| 7,324,962 B1* | 1/2008 | Valliani et al. | 705/14.13 |
| 2001/0054003 A1* | 12/2001 | Chien et al. | 705/14 |
| 2002/0013171 A1* | 1/2002 | Akamatsu | 463/25 |
| 2002/0062253 A1* | 5/2002 | Dosh et al. | 705/14 |
| 2002/0143626 A1* | 10/2002 | Voltmer et al. | 705/14 |
| 2002/0156683 A1 | 10/2002 | Stoutenburg et al. | |
| 2002/0174011 A1 | 11/2002 | Sanchez et al. | |
| 2002/0178056 A1 | 11/2002 | Lim | |
| 2002/0188509 A1 | 12/2002 | Ariff et al. | |
| 2003/0050831 A1 | 3/2003 | Klayh | |
| 2003/0052864 A1* | 3/2003 | Sert et al. | 345/173 |
| 2003/0220834 A1 | 11/2003 | Leung et al. | |
| 2003/0233278 A1* | 12/2003 | Marshall | G06Q 30/0235 705/14.35 |
| 2003/0236704 A1* | 12/2003 | Antonucci | 705/14 |
| 2004/0049427 A1 | 3/2004 | Tami et al. | |
| 2004/0143544 A1* | 7/2004 | Lilge et al. | 705/39 |
| 2004/0186770 A1 | 9/2004 | Pettit et al. | |
| 2004/0186773 A1 | 9/2004 | George et al. | |
| 2004/0193485 A1 | 9/2004 | Ilberg | |
| 2004/0215512 A1 | 10/2004 | Farat | |
| 2004/0219971 A1 | 11/2004 | Ciancio et al. | |
| 2005/0021399 A1 | 1/2005 | Postrel | |
| 2005/0021400 A1 | 1/2005 | Postrel | |
| 2005/0021401 A1 | 1/2005 | Postrel | |
| 2005/0071227 A1 | 3/2005 | Hammad et al. | |
| 2005/0071228 A1* | 3/2005 | Bortolin et al. | 705/14 |
| 2005/0149394 A1 | 7/2005 | Postrel | |
| 2005/0240473 A1* | 10/2005 | Ayers, Jr. | G06Q 30/0234 705/14.21 |
| 2005/0251440 A1 | 11/2005 | Bednarek | |
| 2005/0251446 A1 | 11/2005 | Jiang et al. | |
| 2005/0267800 A1 | 12/2005 | Tietzen et al. | |
| 2005/0273387 A1 | 12/2005 | Previdi | |
| 2007/0022008 A1* | 1/2007 | Kingsborough | G06Q 30/0209 705/14.17 |

OTHER PUBLICATIONS

ValueCentric Marketing Group http://www.vcmg.net.

VeriFone Solutions Spotlight—VCMG Customer Brochure, Jan. 2006 http://www.petro-c.verifone.com/solutions/vcmg/VCMG_Customer.pdf.

VeriFone Solutions Spotlight—VCMG Sales Brochure, Jan. 2006 http://www.petro-c.verifone.com:88/distributors/private/pdf/VCMG_Sales.pdf.

Lofstock, John, "Loyalty Programs Boost Margins and Profitability," OE on the Inside, vol. 1 issue 2, Jun. 2005, pp. 10-11, available at www.opisnet.com/images/OEinside0605_web.pdf.

VeriFone and ValueCentric Marketing Group, Integrated Loyalty Solution, Jan. 2006, available at http://www.petro-c.verifone.com:88/distributors/private/files/VCMG_Loyalty.ppt.

Case Study: The Mirabito-Quickway Rewards Plus Loyalty Program, Jan. 2006, available at http://www.petro-c.verifone.com:88/solutions/vcmg/VCMG_Mirabito.ppt.

VCMG Promotional Brochure, Advanced Loyalty & Rewards Technology, Jun. 2, 2003.

* cited by examiner

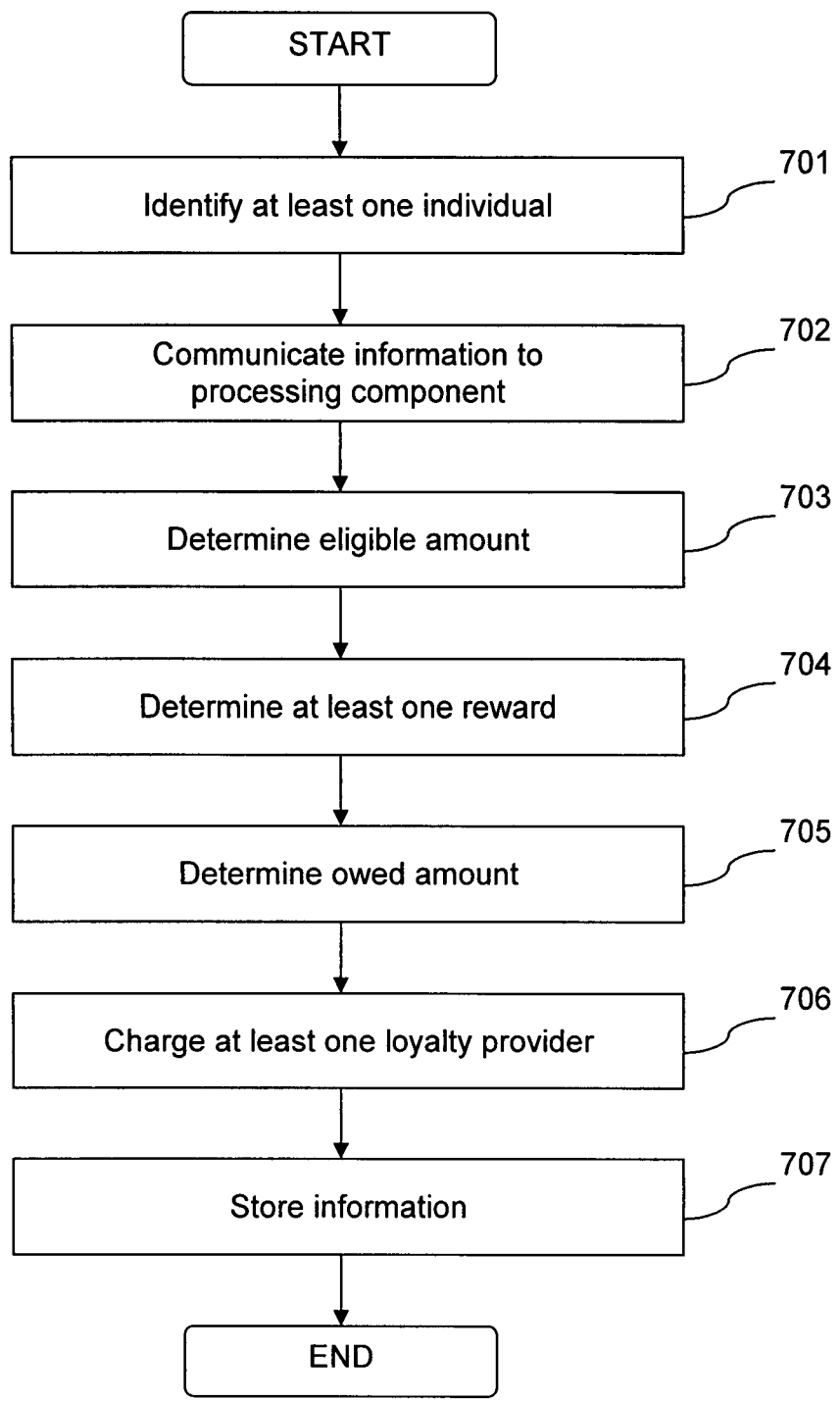

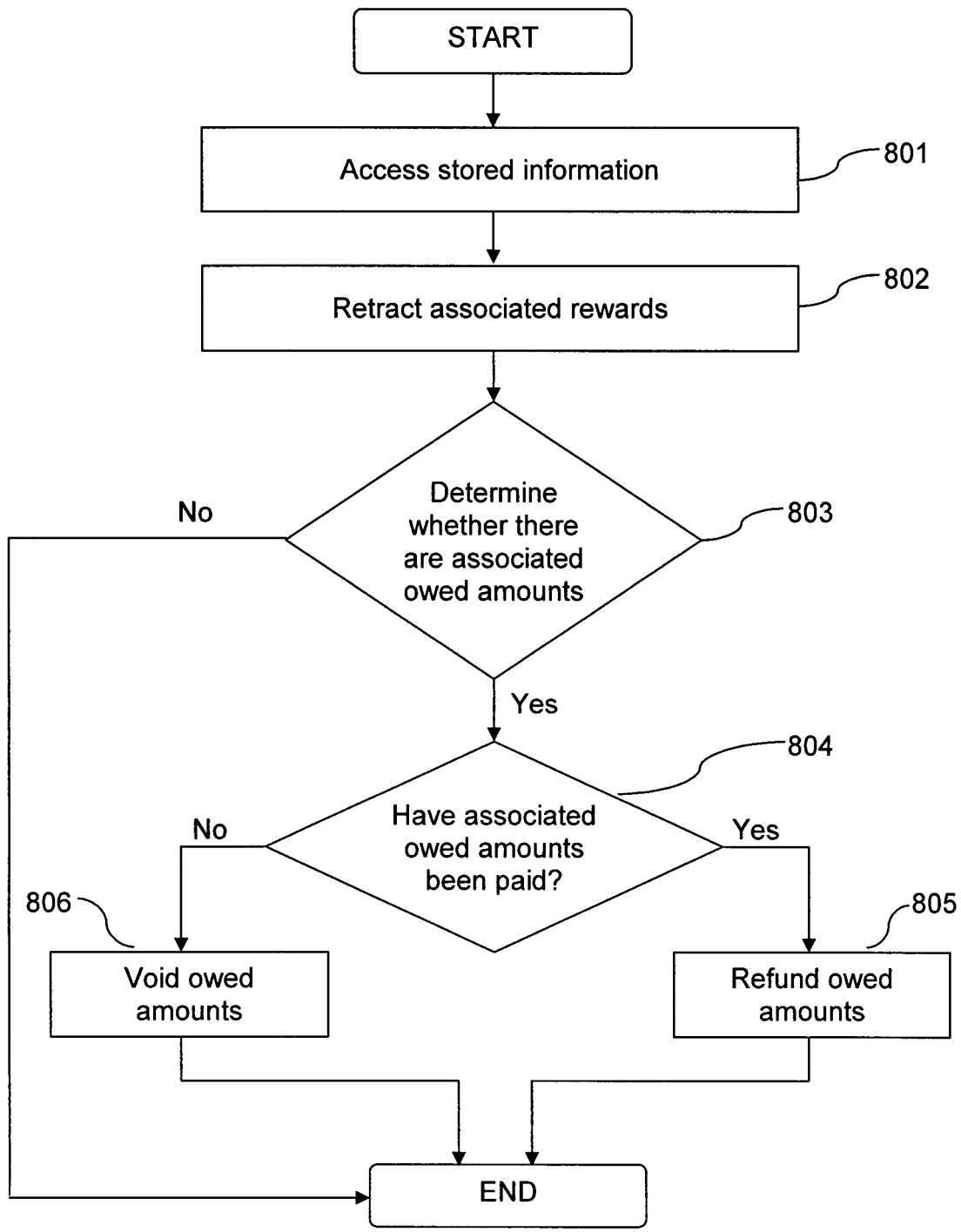

LOYALTY REWARDS MANAGEMENT AND PROCESSING SYSTEM AND METHOD

TECHNICAL FIELD

The present invention generally relates to processing loyalty rewards programs. More particularly, the present invention relates to computerized loyalty rewards programs involving the tracking and storage of transaction and reward information including but not limited to line item details.

BACKGROUND OF THE INVENTION

In recent years, the use of loyalty rewards programs has become widespread in capitalist markets worldwide. They are used by merchants to entice consumers to shop at their establishments and to influence the purchase patterns of customers. A majority of these programs involve simple reward arrangements; similar to those that have been offered by credit card companies for years. For example, many common loyalty rewards programs provide a customer with reward points for dollars spent in a transaction. When such a program is run by a particular merchant, it is used to entice consumers to continue to make purchases at a particular establishment in order accumulate points. Accumulated points can be redeemed for rewards comprising cash and/or various goods and services. Other reward programs are known as "cumulative reward programs." Cumulative reward programs allow a consumer to earn a free product after purchasing a certain quantity of other products. These types of programs commonly use a card that merchants initial or punch to track when a qualifying purchase has been made.

In both of these commonly used reward programs, the merchant typically provides and funds the cost of the rewards. There are, however, certain reward programs that are financed by product manufacturers/vendors. A common example is the reward program run by soft drink companies wherein the bottle top on a soft drink may entitle the consumer to a free soda or other reward. These types of programs, however, do not serve the same purpose as the merchant based programs mentioned above. They do not encourage consumers to shop at a particular establishment. A consumer will be just as likely to receive a free Coca-Cola® by purchasing a Coke® product at any merchant that sells Coca-Cola® products.

There are also hybrid loyalty programs, seen primarily among large, multi-national corporations, wherein a manufacturer contributes to the funding of a reward at a particular merchant establishment. For example, a consumer may receive additional rewards (bonus points) at a particular establishment when they purchase products from a specific manufacturer. The specific manufacturer remunerates the merchant for those additional points. It is difficult, however, for the vast majority of merchants who are not national conglomerates to have access to such hybrid loyalty programs. Therefore, with traditional rewards systems, in order to achieve the merchant's goal of enticing consumers to patronize their establishments, and their establishments alone, the merchant generally must finance the loyalty rewards program themselves. While some existing systems may allow merchants to charge manufacturers/vendors a flat fee for participation in the merchant's loyalty program, these systems are not sophisticated enough to handle complex loyalty programs that track the data necessary to enable merchants to charge numerous manufacturers based on the amount of their respective products purchased, etc., instead of via a flat fee. Manufacturers are generally much more attracted to rewards programs where they can participate on a product level and can therefore accurately assess the costs and benefits of participation in said rewards programs. Accordingly, there exists a need for a software system capable of facilitating such hybrid loyalty programs and therefore relieving merchants of some of the financial burden of maintaining a loyalty rewards program.

There are a number of software systems available on the market today that facilitate management of loyalty rewards programs, many of which are capable of handling loyalty rewards programs in a computerized and automated manner. Most of the existing software products, however, focus on the redemption of loyalty rewards, rather than on the design and setup of how, when, and under what circumstances rewards are awarded to customers. These systems generally involve a mechanism to identify the consumer as a program participant (often a membership card), when earning points. Combined with additional application data, this identification mechanism can also be used as a means to gain access to redeem points for rewards. The vast majority of these systems deem a customer eligible for available rewards by merely identifying them as a system participant. Such systems identify the customer merely as a means of determining to whom the reward should be granted, or by whom it can be redeemed, and not as a means of determining reward eligibility. With these types of systems, eligibility is automatic upon enrollment in the applicable loyalty rewards program.

Merchants, however, may wish to specify additional criteria for determining eligibility, or maintain more complicated loyalty rewards programs than the traditional ones mentioned above. For example, merchants may want to determine eligibility based on the tender the consumer is using to purchase a product, or the quantity of products purchased, or even a large group of criteria. While it is also known to determine eligibility based on particular individual criteria, such as the product purchased or the tender used, existing systems are not capable of using multiple criteria to determine eligibility. A system that would facilitate eligibility determinations based upon multiple criteria could assist merchants in exploring cross-promotional activities and hybrid loyalty programs. For example, rather than having merely a basic loyalty rewards program that awards one point for every dollar spent, a merchant may want to award three points for every dollar spent buying a particular product with a particular tender, and engage in cross promotion with such vendors. If a merchant were capable of implementing a rewards program that involved multiple vendors, this could reduce the difficulty of smaller merchants entering the field of cross-promotion and hybrid loyalty programs among larger vendors. A system capable of designing, implementing, and maintaining a more complicated loyalty rewards program could therefore provide a significant opportunity to merchants. Most traditional systems are not capable of supporting such systems in that, as described above, they are targeted at reward redemption and not reward distribution, and they are not capable of making eligibility determinations based on multiple criteria.

Moreover, traditional systems pertaining to loyalty rewards programs, such as those described above, retain minimal customer information other than identification criteria, such as the customer's name, address, and account number, and data regarding acquired and redeemed rewards. A few existing systems retain collective data associated with the types or amounts of products certain demographic groups of customers purchase to assist in marketing campaigns, but even these systems do not retain line item data regarding each particular transaction a particular customer has made. For example, an existing system may recognize that adult males bought more Coca-Cola® products than Pepsin products in the last three months, but it would not be able to determine which customer bought which particular product with which particular tender on what particular date or in what particular transaction. Even the most complex of existing systems are not capable of determining exactly when or in what particular transaction a customer bought a specific product, nor are such systems capable of determining other relevant data, such as what tender was used to purchase said product. If a system were to retain more detailed information regarding consumers and their particular purchases, it would enable merchants to develop more complex loyalty rewards programs, and to more directly target advertising to particular customers and not just particular demographic groups of customers. Accordingly, a need exists for a system capable of facilitating and supporting complex loyalty rewards programs by identifying, capturing, and storing specific, detailed, line item data associated with customer transactions at a particular merchant.

In addition, a system capable of warehousing more comprehensive transaction data would better facilitate tracking of rewards in regards to returned or exchanged merchandise. With traditional systems, if a customer purchases certain merchandise at a merchant while the merchant is running a special reward promotion and then returns the merchandise after the promotion has expired, the customer may receive unearned rewards because the rewards retracted upon the return will only be equal to the rewards available at the time (after the end of the promotion). For example, assume a merchant has a perpetual rewards program where customers receive one point for every dollar spent at the merchant. If a customer buys one hundred dollars ($100) worth of merchandise during a promotion where they receive three points per dollar spent, they would receive three hundred (300) points. However, if they returned the merchandise after the promotion had expired, a traditional system would only determine the merchandise to be worth one hundred (100) points and would only retract the same from the customer's rewards account. This would allow the customer to receive two hundred (200) free, unearned points. If, however, a system were available that tracked more comprehensive customer and transaction information, such a system could determine when the products were purchased and retract the actual amount of points awarded.

Accordingly, a system capable of facilitating management and processing of loyalty rewards programs that retains not only reward acquisition and redemption data and collective consumer group data, but instead stores specific, detailed, comprehensive data regarding individual customer transactions would provide an immense benefit to merchants. It is believed that such an invention will represent a significant advancement in the art.

OBJECTS AND SUMMARY OF THE INVENTION

It is, therefore, a primary object of the present invention to enhance the loyalty rewards programs art by providing a system capable of facilitating management of loyalty rewards programs that captures, stores, and retains specific, detailed, comprehensive data regarding individual customer transactions.

It is another object of the invention to provide a method of processing transactions in connection with a loyalty rewards program that captures, stores, and retains specific, detailed, comprehensive data regarding individual customer transactions in a relatively facile manner and at relatively low costs.

Consistent with embodiments of the present invention, systems and methods are provided for processing a transaction in connection with a loyalty rewards program.

In accordance with one embodiment, there is provided a system for processing a transaction in connection with a loyalty rewards program, said system comprising: an identification component associated with at least one individual; a transaction processing component configured to identify said at least one individual associated with a transaction based on said identification component; and a loyalty rewards processing component that includes rules and logic associated with a loyalty rewards program and that is configured to receive information associated with said at least one individual and said transaction from said transaction processing component, determine an eligible amount associated with said transaction for at least one promotion, determine at least one reward based on said eligible amount and said at least one promotion, and store information associated with each item purchased in said transaction, including information associated with said purchased item, said at least one individual, said transaction, said at least one promotion, said eligible amount, and said at least one reward.

According to another embodiment, there is provided a method for processing a transaction in connection with a loyalty rewards program comprising identifying at least one individual associated with a transaction; communicating information associated with said individual and said transaction to a loyalty rewards processing component that includes rules and logic associated with a loyalty rewards program and that is configured to receive said information associated with said at least one individual and said transaction; determining an eligible amount associated with said transaction for at least one promotion; determining at least one reward based on said eligible amount and said at least one promotion; and storing information associated with each item purchased in said transaction, including information associated with said purchased item, said at least one individual, said transaction, said at least one promotion, said eligible amount, and said at least one reward.

According to yet another embodiment, there is provided an article of manufacture comprising: a computer readable medium storing means for identifying at least one individual associated with a transaction; communicating information associated with said individual and said transaction to a loyalty rewards processing component that includes rules and logic associated with a loyalty rewards program and that is configured to receive said information associated with said at least one individual and said transaction; determining an eligible amount associated with said transaction for at least one promotion; determining at least one reward based on said eligible amount and said at least one promotion; and storing information associated with each item purchased in said transaction, including information associated with said purchased item, said at least one individual, said transaction, said at least one promotion, said eligible amount, and said at least one reward.

According to still yet another embodiment, there is provided an on-line system for processing a transaction in connection with a loyalty rewards program, said system comprising: an identification component associated with at least one individual; a transaction processing component configured to identify said at least one individual associated with a transaction based on said identification component; and a loyalty rewards processing component that includes rules and logic associated with a loyalty rewards program and that is configured to receive information associated with said at least one individual and said transaction from said transaction processing component, determine an eligible amount associated with said transaction for at least one promotion, determine at least one reward based on said eligible amount and said at least one promotion, and store information associated with each item purchased in said transaction, including information associated with said purchased item, said at least one individual, said transaction, said at least one promotion, said eligible amount, and said at least one reward.

It is understood that both the foregoing general description and the following detailed description are exemplary and explanatory only and are not restrictive of the embodiments of the invention as described and claimed. The description of aspects, features and/or advantages of particular embodiments of the present invention are not intended and should not be construed to provide any limitations on the present claimed invention.

BRIEF DESCRIPTION OF THE DRAWINGS

The accompanying drawings, which are incorporated in and constitute part of the disclosure, illustrate various embodiments and aspects of the present invention. In the drawings:

FIG. 7 is a flow chart illustrating the operations of yet another exemplary embodiment of the present invention; and FIG. 8 is a flow chart illustrating a method involved in the operations of still another exemplary embodiment of the present invention.

BEST MODE FOR CARRYING OUT THE INVENTION

For a better understanding of the present invention, together with other and further objects, advantages and capabilities thereof, reference is made to the following disclosure and appended claims in connection with the above-described drawings. It is understood that, in the absence of a contrary representation, like numerals in different drawings indicate like elements. The implementations in the following description do not represent all implementations consistent with the present claimed invention. Instead, they are merely examples of systems and methods consistent with the invention.

The term "eligible amount" as used herein is meant to include any amount of items (goods and/or services) or currency deemed eligible for any promotion by any means consistent with the present invention.

"Item" as used herein is meant to include any good and/or service.

The term "loyalty provider" as used herein is meant to include any individual, vendor, service provider, business, establishment or other entity that is involved in a loyalty rewards program in any capacity other than as the merchant employing the loyalty rewards program.

"Loyalty rewards program" as used herein is meant to include any system where participating individuals may obtain rewards by performing certain actions.

The term "merchant" as used herein is meant to include any individual, vendor, service provider, business, establishment or other entity engaging in any form of commerce.

"Owed amount" as used herein is meant to include any amount owed by a loyalty provider in connection with a loyalty rewards program, whether monetary or otherwise.

The term "promotion" as used herein shall mean any arrangement associated with a loyalty rewards program where an individual may obtain a reward for any reason.

"Reward" as used herein is meant to include any tangible or intangible item an individual may receive by participating in a loyalty rewards program.

The term "transaction" as used herein is meant to include any matter in which an exchange of any kind is made involving goods and/or services.

Figure 1:
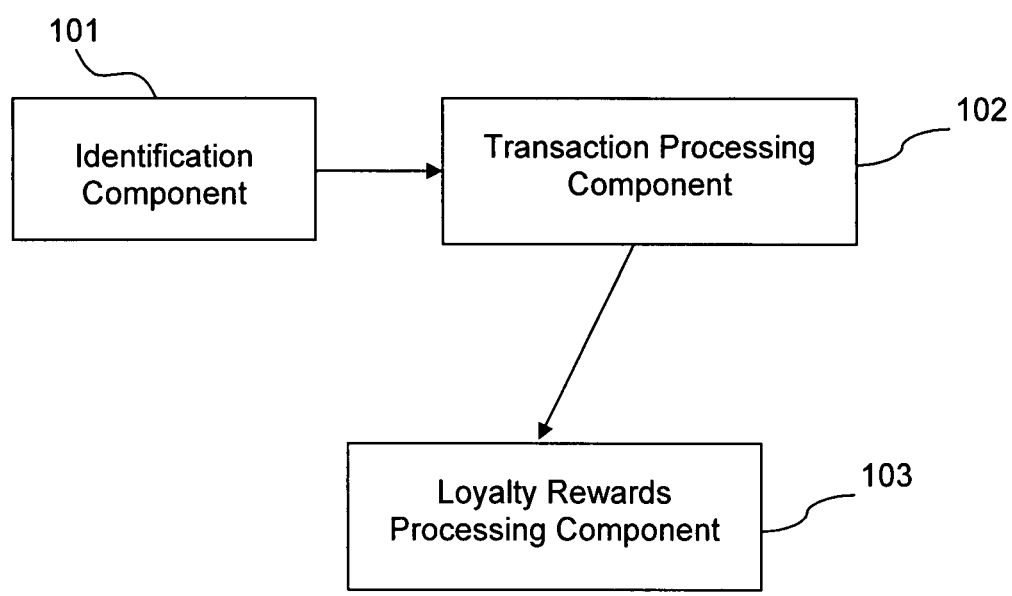
FIG. 1 is a simplified schematic diagram illustrating one exemplary embodiment in accordance with the present invention.

Now referring to the drawings, FIG. 1 is a simplified schematic diagram illustrating an exemplary embodiment in accordance with the present invention. The embodiment depicted in FIG. 1 includes a system 100 having an identification component 101, a transaction processing component 102, and a loyalty rewards processing component 103. While only one identification component 101 and transaction processing component 102 are shown in FIG. 1, it should be understood that some loyalty rewards programs using system 100 might include multiple identification components and/or multiple transaction processing components. In accordance with the present invention, system 100 is capable of accommodating more than one identification component 101 and more than one transaction processing component 102.

In system 100, the identification component 101 is provided to the transaction processing component 102. Identification component 101 is associated with at least one individual, and may be any means capable of identifying an individual, including, but not limited to, customer loyalty cards, credit cards, checks, drivers' licenses or other forms of picture identification, biometric data, vocal data, account numbers, and other identification information such as user names and/or passwords. Transaction processing component 102 is configured to process identification component 101 and identify said at least one individual based on identification component 101. Moreover, transaction processing component 102 is configured to process the current transaction. Transaction processing component 102 comprises any device(s) capable of identifying and validating the identity of said at least one individual and processing said transaction. In one embodiment, a single device is capable of both identifying said at least one individual and processing said transaction. In other embodiments, however, separate but connected devices may be implemented to identify said at least one individual by processing the identification component 101 and to process said transaction. Such devices may include, but are not limited to, a magnetic card reader, a keyboard for entering data, a combination magnetic card reader and data entering device, a scanning device, any biometric input device such as a fingerprint reading technology, a voice recognition device, a cash register, a computer, or any other devices capable of perceiving and authenticating the identification component 101 and processing the transaction, whether alone or in conjunction with one another.

Transaction processing component 102 is also configured to communicate information associated with said at least one individual and said transaction to the loyalty rewards processing component 103. Loyalty rewards processing component 103 includes rules and logic associated with a loyalty rewards program and is configured to receive the information associated with said at least one individual and said transaction communicated by transaction processing component 102. Upon receipt of said information, loyalty rewards processing component 103 is also configured to determine an eligible amount associated with said transaction for at least one promotion, determine at least one reward based on said eligible amount and said at least one promotion, and store information associated with each item purchased in said transaction, including information associated with said purchased item, said at least one individual, said transaction, said at least one promotion, said eligible amount, and said at least one reward. These operations will be discussed in further detail below with regards to FIGS. 3-8. Loyalty rewards processing component 103 is preferably a computer device, but may also be any device capable of performing the operations described above. In addition, loyalty rewards processing component 103 may comprise a plurality of devices that communicate with each other, for example, via wired or wireless networks. Accordingly, loyalty rewards processing component 103 may comprise a plurality of devices located in different physical locations.

Figure 2:
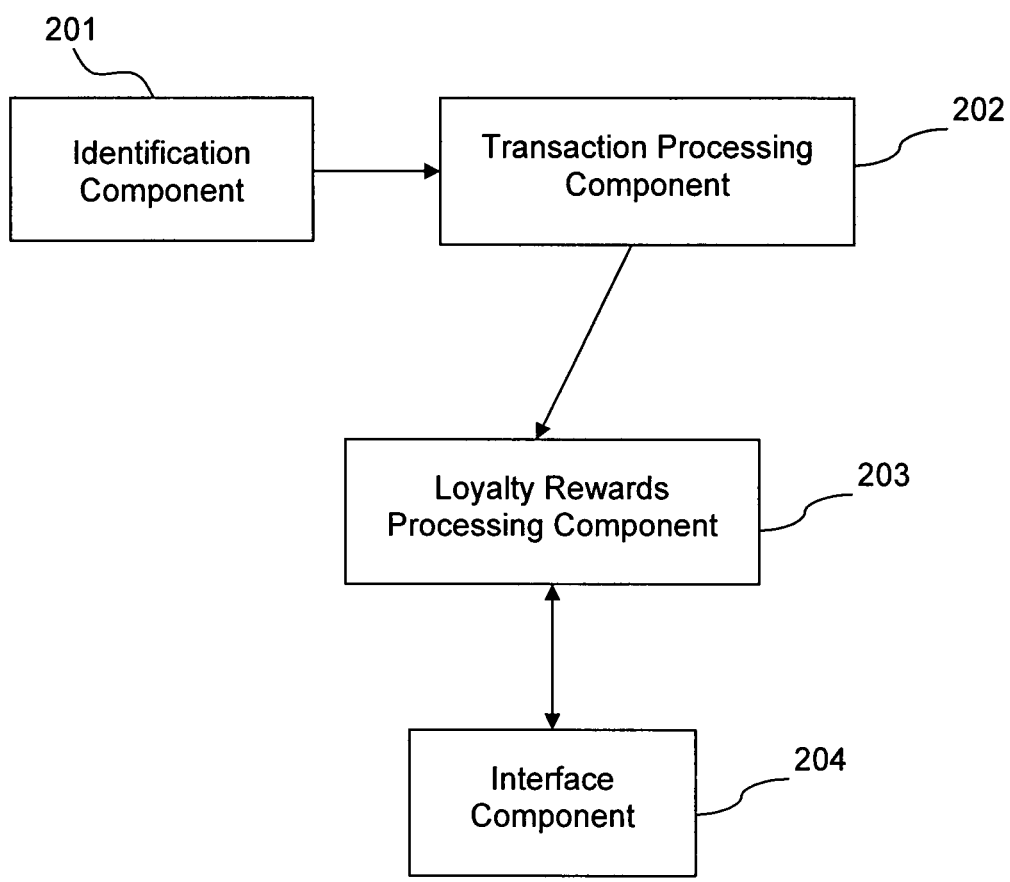
FIG. 2 is a simplified schematic diagram illustrating another exemplary embodiment in accordance with the present invention.

FIG. 2 is a simplified schematic diagram illustrating another exemplary embodiment in accordance with the present invention. FIG. 2 includes a system 200 having an identification component 201, a transaction processing component 202, a loyalty rewards processing component 203, and an interface component 204. While only one identification component 201, transaction processing component 202, and interface component 204 are shown in FIG. 2, it should be understood that some loyalty rewards programs using system 200 might include multiple identification components, multiple transaction processing components, and/or multiple interface components. In accordance with the present invention, system 200 is capable of accommodating more than one identification component 201, more than one transaction processing component 202, and more than one interface component 204.

In system 200, as in system 100, identification component 201 is provided to the transaction processing component 202, which is configured to process identification component 201, identify said at least one individual based on identification component 201, process the current transaction, and communicate information associated with said at least one individual and said transaction to the loyalty rewards processing component 203. Loyalty rewards processing component 203 includes rules and logic associated with a loyalty rewards program and is configured to receive the information associated with said at least one individual and said transaction from said transaction processing component 202, determine an eligible amount associated with said transaction for at least one promotion, determine at least one reward based on said eligible amount and said at least one promotion, and store information associated with each item purchased in said transaction, including information associated with said purchased item, said at least one individual, said transaction, said at least one promotion, said eligible amount, and said at least one reward.

Interface component 204 is connected to loyalty rewards processing component 203 and provides individuals with the ability to view, manage, and/or maintain the loyalty rewards program, the various aspects thereof, and the rules and logic associated therewith. FIG. 2 depicts interface component 204 as being a separate device from loyalty rewards processing component 203, however, consistent with the present invention, in another embodiment interface component 204 could be an integrated part of loyalty rewards processing component 203. For example, in one embodiment, loyalty rewards processing component 203 may be an on-site computer at a merchant's location. In this case, interface component 204 may be a front end program built into loyalty rewards processing component 203 which allows an individual to log in and access the data stored in loyalty rewards processing component 203. In other embodiments, interface component 204 may be a separate device from loyalty rewards processing component 203, as shown in FIG. 2. For example, interface component 204 may be a web-based interface that an individual can access from any computer or other Internet-accessible device. Upon entering authentication information (such as a login ID and password), the individual would be able to access the data stored in loyalty rewards processing component 203 from any Internet accessible device. Accordingly, interface component 204 may be any device that enables individuals to view, access, change, and/or update the data stored in loyalty rewards processing component 203.

Interface component 204 also may have different uses. In the example of a web-based interface component 204 with a login authentication screen, in one embodiment, a merchant may wish to allow individual participants to access their account information remotely by providing them with a login and password. The merchant could put any desired limitations on such access, such as allowing individuals to only view their existing rewards and prohibiting individuals from making any changes to their account. Or the merchant could allow individuals to redeem rewards online and to update their demographic information via interface component 204. Moreover, the merchant could use interface component 204 to update the rules and logic associated with their loyalty rewards program by changing any of the parameters associated therewith. Accordingly, interface component 204 may be used to provide both individual participants and merchants with information regarding the loyalty rewards program.

Figure 3:
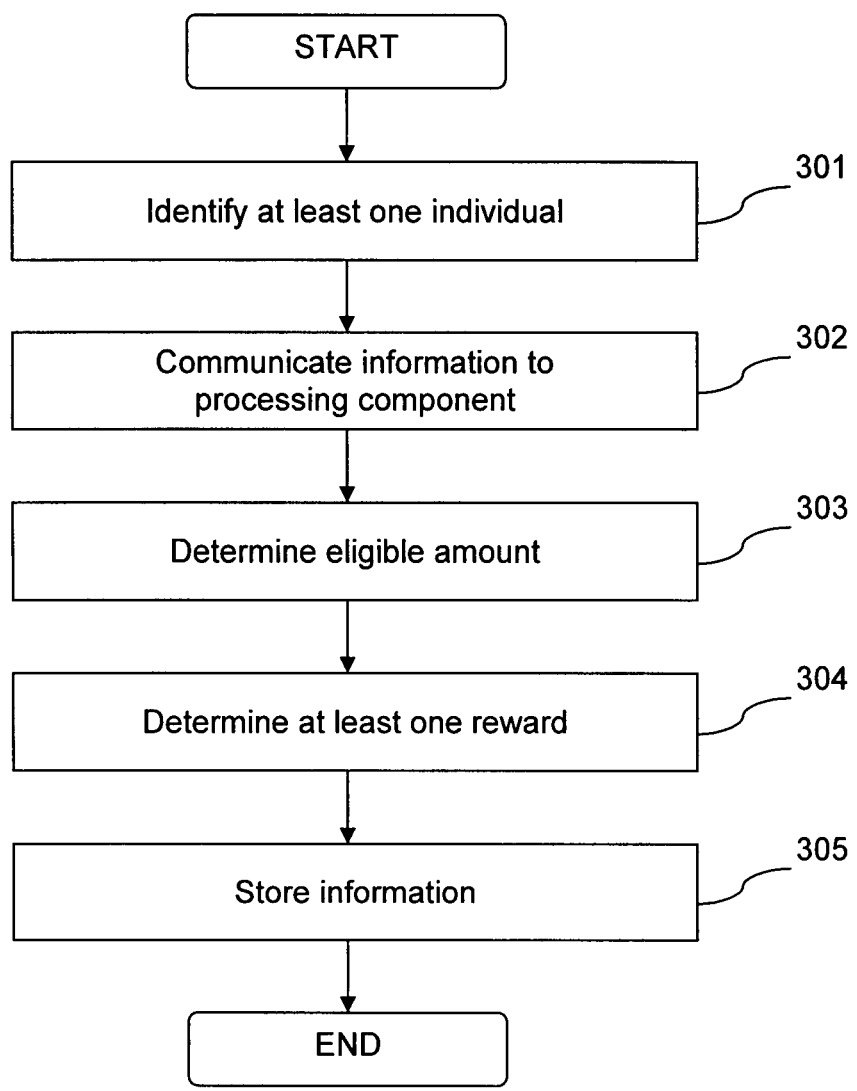
FIG. 3 is a flow chart illustrating the operations of an exemplary embodiment of the present invention.

FIG. 3 is a flow chart illustrating the operations of an exemplary embodiment of the present invention. In step 301, the transaction processing component identifies at least one individual by receiving and processing the identification component. While there will commonly only be one individual associated with a particular transaction, the present invention is capable of processing transactions that involve more than one identified individual. After the transaction processing component has identified the individual(s) associated with the transaction, in step 302, the transaction processing component communicates information associated with the at least one individual and the transaction to the loyalty rewards processing component. The loyalty rewards processing component includes rules and logic associated with the loyalty rewards program and is configured to receive said information. In step 303, the loyalty rewards processing component determines an eligible amount for at least one promotion based on the rules and logic associated with the loyalty rewards program. There may be transactions to which more than one promotion is applicable, in which case the eligibility determination is made for each applicable promotion. A merchant can determine what rules and logic it wishes to apply in determining eligibility for certain promotions and/or rewards. Said eligibility determinations can be based on the items purchased, the tender used to purchase the items, the individual purchasing the items, or any other criteria desired by the merchant. Step 303 is further analyzed and explained in regards to FIGS. 4-6.

After the eligible amount has been determined for at least one promotion, in step 304 at least one reward is determined based on said eligible amount and said at least one promotion. A reward can be any tangible or intangible item an individual may receive by participating in a loyalty rewards program, including but not limited to, points, cash-back, free items, gift certificates based on accumulated credits, etc. For example, if the applicable promotion is that one point is awarded for every eligible dollar spent and the eligible amount is ten dollars ($10.00), then the reward would be ten points. As described above with respect to step 303, there may be transactions where more than one promotion is applicable. For example, assume a merchant has one promotion awarding ten cents ($0.10) cash back for every dollar spent and another promotion awarding a free Coca-Cola® after purchasing five Coca-Cola® products. If an individual purchase five Coca-Cola® products that cost a total of $15.00, provided there are no additional rules regarding eligibility, the individual would receive $1.50 cash back and a free Coca-Cola® product. Rewards may be determined and awarded in real time, at the end of a particular transaction, or at a later time when the loyalty rewards processing component processes and updates all the information it has received since its last update. Accordingly, in one embodiment, the consumer may receive the $1.50 cash back reward immediately, reducing their transaction cost to $13.50. Alternatively, in another embodiment, the consumer may receive the $1.50 cash back reward at the close of the transaction via a coupon for $1.50 off their next purchase attached to their receipt for the transaction. Moreover, in yet another embodiment, the consumer may receive a $1.50 coupon upon their next transaction at the store; and in still another embodiment, the consumer may receive a $1.50 in the mail at a later date. Furthermore, a loyalty rewards program implemented using the present invention may generate customer statements on a set time period (e.g. weekly, monthly, etc.) that provide customers with the rewards they have accumulated since the last statement (whether tangible, as in a gift certificate, or intangible, as in a statement of accumulated points).

Finally, in step 305 the loyalty rewards processing component stores the information associated with each item purchased in the transaction. Said stored information includes information associated with the purchased item, such as price and quantity; information identifying said at least one individual, such as name, account number, etc.; information associated with said transaction, such as the tender used and the date of purchase; information associated with said at least one promotion sufficient to identify said promotion and the parameters of same; information associated with said eligible amount, including the determination of same; and information associated with said at least one reward, including how said reward was or is to be awarded and how said reward may be redeemed. As indicated, the present invention stores said information on a line item level for each item purchased in the transaction. Accordingly, while the system is capable of providing cumulative eligible amounts and rewards for a particular individual, promotion, or other criteria, the information detailed above is stored on a StockKeeping Unit (SKU) level, where said information, including the eligible amount, tender(s) used, etc., is available for each particular item purchased in said transaction. This information is stored in the loyalty rewards processing component so that, among other things, the system may ensure that eligible amounts are properly determined, rewards are properly awarded and redeemed, and so that a transaction is readily accessible in the event of a return. Returns are explained in more detail with reference to FIG. 8.

Moreover, storing said information allows merchants to more specifically target marketing not just to demographic groups (as has been traditionally done) but to individual customers. It will allow merchants to have a more comprehensive buying profile of individuals to present to loyalty providers in an attempt to establish cross-promotional arrangements. For example, if the stored data indicates that a particular individual has not purchased a particular product for an extended period of time, the merchant may be able to target marketing towards that product. Alternatively, in another example, if the stored data indicates that a customer purchases a particular product each week, that would allow merchants to target marketing on a specific brand of that product. Moreover, if the loyalty rewards processing component of a particular embodiment processes transactions on a real time basis, the system of the present invention would support dynamic alteration and personalization of promotions based on the identified individual and the associated stored data. Furthermore, storing this information on a line item basis also allows for more complex rewards promotions, in that loyalty providers and merchants can target very specific criteria for promotions, and can also run promotions that involve numerous criteria. For example, the present invention would support a promotion based on a specific product, a specific tender, and even a specific time of day for purchase. In addition, if promotion eligibility is determined based on eligible tenders (see FIG. 5 for additional details) and reward determinations are not done at the time of transaction, storing such data is necessary to determine proper reward eligibility.

Figure 4:
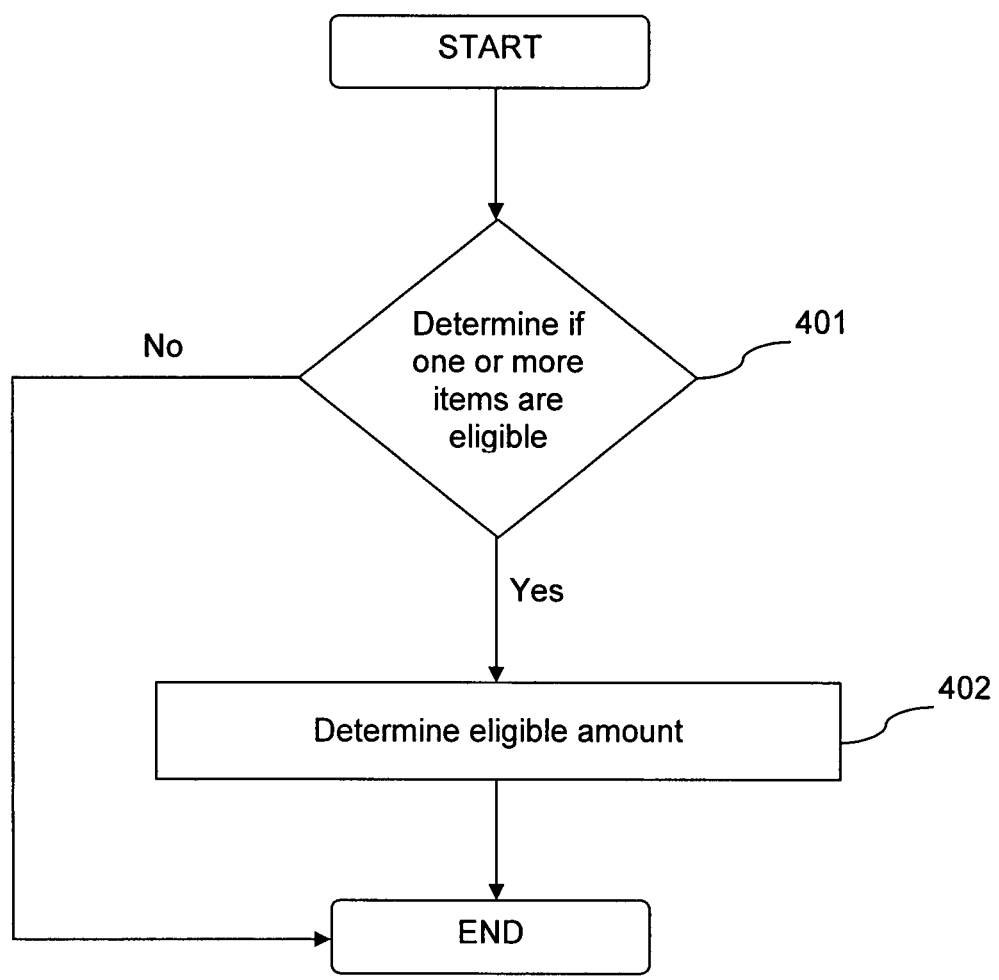
FIG. 4 is a flow chart illustrating a method involved in the operations of an exemplary embodiment of the present invention.

FIG. 4 is a flow chart illustrating a method involved in the operations of an exemplary embodiment of the present invention. FIG. 4 depicts one method of determining an eligible amount, as described in step 303 of FIG. 3. In the embodiment depicted in FIG. 4, the eligible amount is determined based on whether or not the items purchased are eligible. In step 401, the loyalty rewards processing component determines whether a purchased item is eligible for a promotion. For example, if the merchant is running a promotion on Coca-Cola® products, a Pepsi® product would not be eligible. In another example, if a merchant were running a cash back promotion on jeans, but wanted to exclude certain name brand jeans, the loyalty rewards processing component would contain rules and logic concerning which brands of jeans were eligible, and would make the eligibility determination for each item based on that criteria. In yet another example, if the merchant were running a promotion that awarded three points per dollar spent on Hershey® candy bars if three or more are purchased in a single transaction, then if an individual bought two Hershey® candy bars, neither item would be eligible, but if an individual bought four Hershey® candy bars, then all four items would be eligible. If the loyalty rewards processing component determines that an item is not eligible in step

401, then the eligible amount is zero. If, however, the loyalty rewards processing component determines that an item is eligible (step 401), then the loyalty rewards processing component uses the rules and logic associated with the loyalty rewards program (which may involve other eligibility criteria) to determine an eligible amount (step 402). If more than one item is purchased in a particular transaction, then steps 401 and 402 (if necessary) will be performed for each purchased item.

Figure 5:
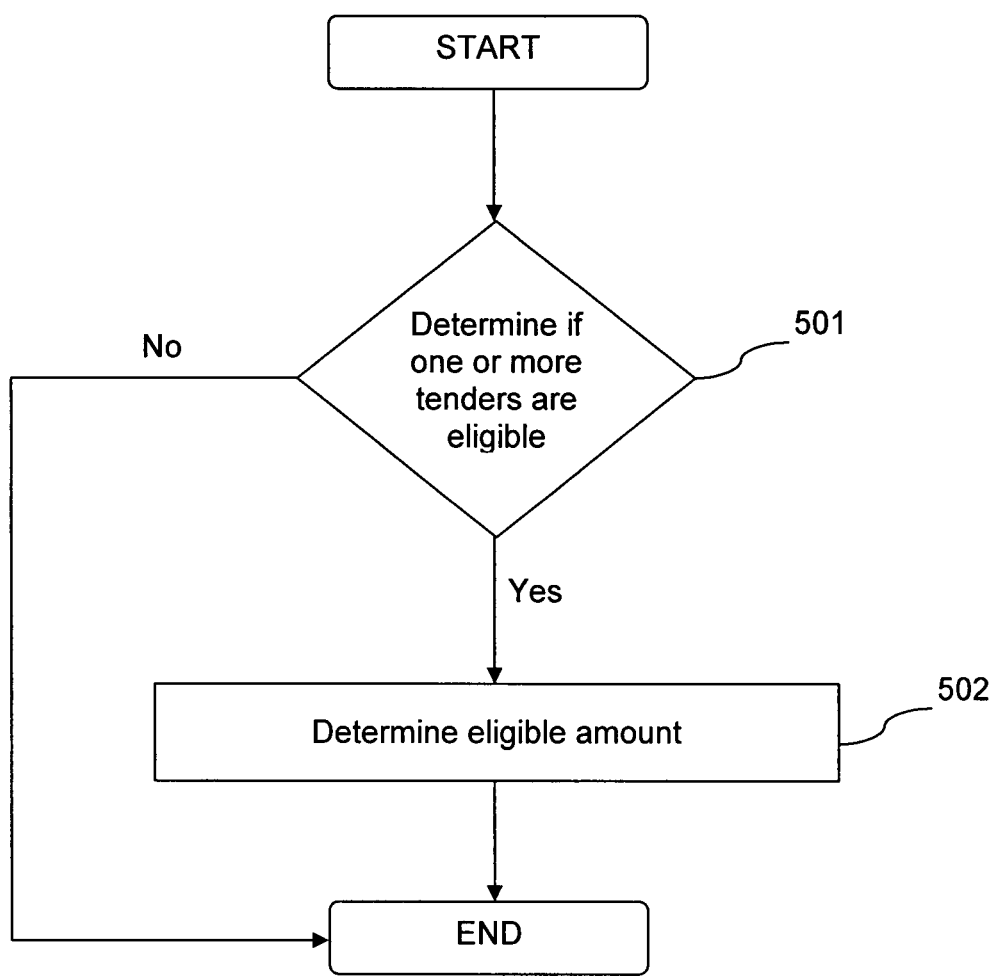
FIG. 5 is a flow chart illustrating a method involved in the operations of another exemplary embodiment of the present invention.

FIG. 5 is a flow chart illustrating a method involved in the operations of another exemplary embodiment of the present invention. FIG. 5 depicts another method of determining an eligible amount, as described in step 303 of FIG. 3. In the embodiment depicted in FIG. 5, the eligible amount is determined based on whether or not the tenders used to purchase items in the transaction are eligible. In step 501, the loyalty rewards processing component determines whether a tender used to purchase an item is eligible for a promotion. For example, a merchant could run a promotion where only items purchased with a proprietary merchant card (such as a Saks Fifth Avenue® card) are eligible for a promotion. In that case, if the same items were purchased with a non-proprietary credit card, they would not be eligible. This also allows for cross-promotional opportunities in that a merchant could run a similar promotion with a particular credit card company or a local bank. In another example, a merchant could require customers to register their credit cards with the loyalty rewards program either at the merchant's establishment or via an interface component such as those described in reference to FIG. 2. Then the merchant could run a promotion where only goods purchased with a registered tender were eligible for particular promotions. This may be used, for example, as a marketing tool to get customers to visit the merchant's web site. If the loyalty rewards processing component determines that a tender is not eligible in step 501, then the eligible amount is zero. If, however, the loyalty rewards processing component determines that a tender is eligible (step 501), then the loyalty rewards processing component uses the rules and logic associated with the loyalty rewards program (which may involve other eligibility criteria) to determine an eligible amount (step 502).

The system of the present invention also allows for an eligible tender determination when more than one tender is used. For example, suppose a merchant is running a promotion where one point is awarded per dollar spent, but only on items purchased with a proprietary merchant card. Following this example, imagine an individual buys $100 worth of goods but pays $50 with the proprietary card and $50 in cash. In this case, assuming no other rules concerning eligibility, all of the items would be eligible, but only half of the amount spent on each item would be eligible, making the eligible amount $50 (step 502). Again, as detailed above with respect to step 305 of FIG. 3, the tender used, eligible amount, and other relevant information would be stored on a SKU level for each item purchased.

Figure 6:
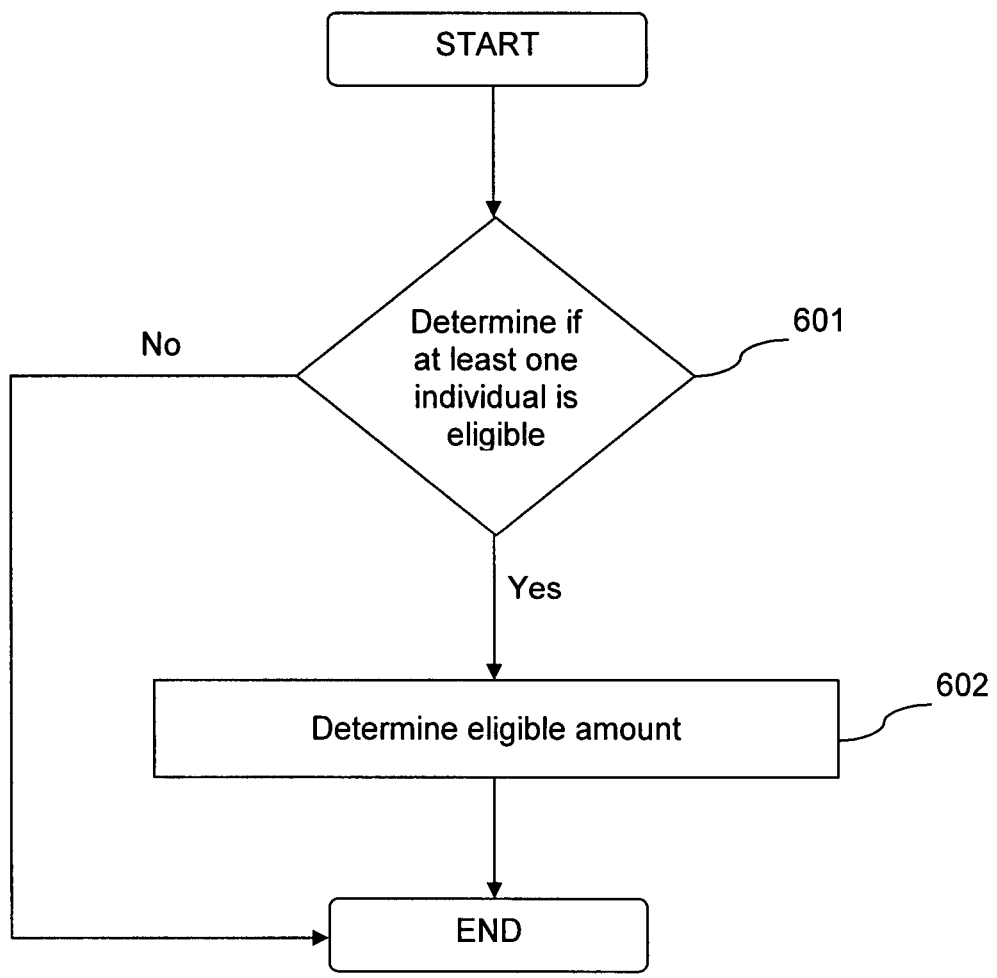
FIG. 6 is a flow chart illustrating a method involved in the operations of yet another exemplary embodiment of the present invention.

FIG. 6 is a flow chart illustrating a method involved in the operations of yet another exemplary embodiment of the present invention. FIG. 6 depicts another method of determining an eligible amount, as described in step 303 of FIG. 3. In the embodiment depicted in FIG. 6, the eligible amount is determined based on whether or not the individual associated with the transaction is eligible. In step 601, the loyalty rewards processing component determines whether an individual is eligible for a promotion. For example, a merchant may run a promotion available only to customers who have spent $500 or more with the merchant in any given month. In this example, the loyalty rewards processing component would have to access stored data associated with an identified individual to determine how much money the individual has spent in the current month in order to determine if the individual is eligible for the promotion. As an example, assume a merchant is running a promotion involving money spent in excess of $500. If an individual engages in a transaction for $250 that brings their monthly total to $700, the eligible amount (step 602) would be $200 (amount in excess of $500). In addition, promotions could be run based on demographic data, such as birthdays, and the loyalty rewards processing component would again have to access the stored data associated with an individual to determine if the individual is eligible for the promotion. If the loyalty rewards processing component determines that an individual is not eligible in step 601, then the eligible amount is zero. If, however, the loyalty rewards processing component determines that an individual is eligible (step 601), then the loyalty rewards processing component uses the rules and logic associated with the loyalty rewards program (which may involve other eligibility criteria) to determine an eligible amount (step 602).

The system of the present invention is also capable of processing transactions associated with loyalty rewards systems that have multiple eligibility criteria. For example, imagine Saks Fifth Avenue® is running a promotion where rewards are available for money spent on Calvin Klein® brand clothing with a proprietary Saks Fifth Avenue® card in excess of $500 in a month. The loyalty rewards processing component would have to access stored data each time a customer makes a transaction that may be eligible for the reward (e.g. uses Saks Fifth Avenue® card, buys Calvin Klein® products) to determine if all the criteria have been met. If and when all the criteria have been met, the loyalty rewards processing component would then have to determine an eligible amount based on all the criteria. Following the example above, if an individual purchases a $300 Calvin Klein® dress using a proprietary Saks Fifth Avenue® card and the stored data for an individual reflects that the individual has previously spent $400 this month on Calvin Klein® products with the Saks Fifth Avenue® card, then the eligible amount for this transaction would be $200.

FIG. 7 is a flow chart illustrating the operations of yet another exemplary embodiment of the present invention. In step 701, the transaction processing component identifies at least one individual by receiving and processing the identification component. After the transaction processing component has identified the individual(s) associated with the transaction, in step 702, the transaction processing component communicates information associated with the at least one individual and the transaction to the loyalty rewards processing component, which includes rules and logic associated with the loyalty rewards program and is configured to receive said information. Steps 701 and 702 are more fully explained above in the description of steps 301 and 302 of FIG. 3. In step 703, the loyalty rewards processing component determines an eligible amount for at least one promotion based on the rules and logic associated with the loyalty rewards program, as was further analyzed and explained in regards to FIGS. 4-6 above. After the eligible amount has been determined for at least one promotion, in step 704 at least one reward is determined based on said eligible amount and said at least one promotion. Step 704 is more fully explained above in the description of step 304 of FIG. 3.

After at least one reward has been determined, in step 705, an owed amount, if any, associated with at least one loyalty provider based on said at least one promotion and said at least one reward is determined. First, the loyalty rewards processing component determines if the reward(s) awarded in the current transaction involve a cross-promotional arrangement with a loyalty provider. In one embodiment, this determination may be made by accessing the rules and logic associated with the loyalty rewards program. If such a cross-promotional arrangement is involved, the loyalty rewards processing component determines the amount owed by any applicable loyalty provider(s) regarding the current transaction. For example, assume a merchant is running the promotion described above in relation to FIG. 3 awarding a free Coca-Cola® after purchasing five Coca-Cola® products. If the buy five get one free Coca-Cola® promotion described above was a cross-promotional arrangement with Coca-Cola® where Coca-Cola® agreed to pay half of the cost of the reward, based on the analysis provided with respect to FIG. 3, Coca-Cola® would now have an owed amount of $1.50. This is based on the purchase of five Coca-Cola® products at $3.00/each (thus the $15.00 total), and the reward of one free Coca-Cola®. The total cost of the reward would be $3.00, therefore Coca-Cola's owed amount based on the arrangement would be $1.50. In a situation where more than one loyalty provider was involved in a cross-promotion, an owed amount would similarly be determined for each loyalty provider based on the rules and logic associated with the arrangement in the loyalty rewards processing component.

Once an owed amount, if any, has been determined, in step 706 the at least one loyalty provider is charged for said owed amount. Preferably, this would be done by sending account statements to loyalty providers on a set basis (e.g. monthly, bimonthly, etc.). It is understood, however, that the present invention would accommodate any means of charging loyalty providers for the owed amounts, such as, for example, directly debiting the money from loyalty providers' accounts. Finally, in step 707 the loyalty rewards processing component stores the information associated with each item purchased in the transaction. Said stored information includes information associated with the purchased item, said at least one individual, said transaction, said at least one promotion, said eligible amount, and said at least one reward, as described in more detail above with regards to step 305 of FIG. 3. In the embodiment illustrated in FIG. 7, however, said stored information also includes information associated with said owed amount and the associated loyalty provider(s), including the value of any said owed amounts and the method of retrieval for the same. This information is stored in the loyalty rewards processing component so that the system may ensure that rewards are properly awarded and redeemed, that loyalty providers are charged any owed amounts and that any said owed amounts are recovered, and that a transaction is readily accessible in the event of a return. Returns are explained in more detail below with reference to FIG. 8.

FIG. 8 is a flow chart illustrating a method involved in the operations of still another exemplary embodiment of the present invention. FIG. 8 depicts the operations of an embodiment of the present invention involved in processing returns. In step 801, the loyalty rewards processing component accesses the stored information associated with the identified individual. After the stored information associated with said individual is accessed, the loyalty rewards processing component retracts any rewards associated with the returned item(s) (step 802). Step 802 is preferably performed using the receipt for the transaction to identify the particular transaction in which the item(s) being returned were purchased. In the event that no receipt is available, the stored data can be used to retrieve the most recent transaction in which the particular item being returned was purchased. Once the transaction in which the item(s) being returned were purchased is identified, the stored data will provide information on the reward awarded upon said purchase, and retract the reward accordingly. The line-item stored data allows merchants to avoid the problem discussed earlier of individuals being able to obtain free, unearned points by purchasing an item during a promotion and then returning it after the promotion has expired.

Once the associated rewards have been retracted (step 802), the loyalty rewards processing component will determine whether any owed amounts are associated with the returned item(s) (step 803). If there are no associated owed amounts, then the return process is complete. If there are associated owed amounts, however, the loyalty rewards processing component then must determine whether any of the associated owed amounts have already been paid by the applicable loyalty provider(s) (step 804). If any owed amount has been paid, the loyalty rewards processing component will refund the owed amount to the applicable loyalty provider (step 805). This will be accomplished via any available method, including but not limited to, direct deposit to the loyalty provider's account, deducting said amount from any current owed amount balance, or sending a monetary refund to the loyalty provider. If the loyalty rewards processing component determines that any owed amount has not been paid (step 804), said owed amount will be voided (step 806).

While the detailed descriptions of certain exemplary embodiments of the present invention have been described primarily in reference to single individuals, promotions, eligible amounts, rewards, and owed amounts and/or loyalty providers, where applicable, a system according to the present invention is capable of processing transactions that involve multiple individuals, promotions, eligible amounts, rewards, and owed amounts and/or loyalty providers, where applicable. For example, if three individuals wish to purchase one item by splitting the price but all want to receive any associated rewards, each individual would provide an identification component and the transaction processing component would identify all three individuals. The loyalty rewards processing component would then receive information associated with all three individuals, and would need to determine, based on the rules and logic associated with a particular promotion, whether each individual was eligible for a promotion. Following this example, assume the merchant is running a promotion awarding one point per dollar spent using a registered Visa credit card. Further assume that the item was a Sony® television costing $300, and that each individual paid $100; individual A using a registered Visa credit card, individual B using cash, and individual C using an unregistered Visa credit card. The eligible amount for individuals B and C would be $0, and the eligible amount for individual A would be $100.

The present invention is also capable of handling transactions that involve multiple promotions. Following the above example, imagine the merchant is running a second promotion awarding $10 cash back on every $100 spent on Sony® electronic devices using a Visa credit card. Regarding this promotion, the eligible amount for individuals A and C would be $100 because each individual met the criteria for this second promotion by using a Visa credit card (no registration required), and the eligible amount for individual B would be $0. The examples provided above also involve multiple rewards. Individual A would receive 100 points from the first promotion and $10 cash back from the second promotion. Individual C would receive $10 cash back form the second promotion, and individual B would receive no reward. Furthermore, in one embodiment of the present invention, the above example could involve multiple loyalty providers and multiple owed amounts. Assume that the first promotion was a cross-promotional arrangement with Visa where Visa agrees to pay for half the cost of any rewards awarded. Assume also that the second promotion was a cross-promotional arrangement with Visa and Sony, where Visa and Sony each agreed to pay 30% of the cost of any reward awarded. In this transaction, the second promotion involves multiple loyalty providers (Visa and Sony) and Visa would be charged for multiple owed amounts (from the first and second promotions). In any transaction involving multiple parameters, the present invention will store line-item information associated with each individual, each item purchased, each promotion, each eligible amount, each reward, each owed amount and each loyalty provider.

Thus there has been shown and described a system and method for processing a transaction in connection with a loyalty rewards program comprising an identification component associated with at least one individual; a transaction processing component configured to identify said at least one individual associated with a transaction based on said identification component; and a loyalty rewards processing component that includes rules and logic associated with a loyalty rewards program and that is configured to receive information associated with said at least one individual and said transaction from said transaction processing component, determine an eligible amount associated with said transaction for at least one promotion, determine at least one reward based on said eligible amount and said at least one promotion, and store information associated with each item purchased in said transaction, including information associated with said purchased item, said at least one individual, said transaction, said at least one promotion, said eligible amount, and said at least one reward.

While there have been shown and described what are at present the preferred embodiments of the invention, it will be obvious to those skilled in the art that various changes and modifications may be made therein without departing from the scope of the invention as defined by the appended claims. Accordingly, the foregoing description of possible embodiments consistent with the present invention does not represent a comprehensive list of all such embodiments, nor does it represent all variations of the embodiments described. The description of only some embodiments should not be construed as an intent to exclude other embodiments or implementations. Artisans will understand how to implement the invention in the appended claims in many other ways, using equivalents and alternatives that do not depart from the scope of the following claims. Moreover, unless indicated to the contrary in the preceding description, none of the components described in the implementations are essential to the invention.

What is claimed is:

1. A computer system, comprising:
an identification component to acquire identification information of a plurality of individuals and information of a transaction initiated by the plurality of individuals, the identification component comprising at least one of a magnetic card reader, a scanning device, a biometric input device, or a keyboard;
at least one processor in communication with the identification component, the at least one processor comprising an interface component in communication with an Internet-accessible user device, wherein the interface component is configured to
receive, from the Internet-accessible user device, user input for updating at least one of the identification information or rules associated with a loyalty rewards program, and
provide, to the Internet-accessible user device, an authentication interface for accessing information associated with the loyalty rewards program; and
a storage device coupled to the at least one processor and storing instructions which, when executed by the at least one processor, cause the system to perform operations comprising:
identifying the plurality of individuals based on the identification information;
storing data descriptive of a first item purchased in the transaction in a line item format, the line item format comprising a stock keeping unit (SKU) indicating an identity of the first item, identities of the plurality of individuals, a tender used by each of the plurality of individuals, a payment amount made by each of the plurality of individuals, and at least one promotion related to the loyalty rewards program;
comparing the line item data with the rules associated with the loyalty rewards program;
determining whether the plurality of individuals are eligible for the at least one promotion, based at least on the rules associated with the loyalty rewards program, and
on other transactions made by the plurality of individuals prior to the transaction;
determining whether the tender used by each of the plurality of individuals is eligible for the at least one promotion based on the rules associated with the loyalty rewards program;
determining an eligible amount associated with the transaction for each of the plurality of individuals, based at least on whether the plurality of individuals and the tenders used by the plurality of individuals are eligible for the at least one promotion;
determining at least one reward for each of the plurality of individuals, based on the comparing of the line item data with the rules, the determined eligible amounts, and the at least one promotion;
determining an owed amount associated with at least one loyalty provider based on the at least one promotion and the rewards; and
storing, in the storage device, information of each of the rewards and the owed amount as part of the line item data of the first item.

2. The system of claim 1 wherein determining at least one reward comprises calculating a reward amount for each of the plurality of individuals, based on the determined eligible amount, the at least one promotion, and the rules associated with the loyalty rewards program.

3. The system of claim 1 wherein the interface is web-based.

4. The system of claim 1 wherein the operations further comprise:
determining whether the first item is eligible for the loyalty rewards program based on the rules associated with the loyalty rewards program; and
determining an eligible amount associated with the transaction eligible for each of the plurality of individuals is based at least in part on whether the first item is eligible for the at least one promotion.

5. The system of claim 1 wherein the operations further comprise retracting the at least one reward from each of the plurality of individuals, when a comparison of the line item data with stored data relating to the plurality of individuals determines a return of the purchase.

6. The system of claim 1 wherein the operations further comprise:
charging the at least one loyalty provider for the owed amount.

7. The system of claim 6 wherein the line item data comprises information associated with the at least one loyalty provider.

8. The system of claim 7 wherein the operations further comprise determining the owed amount based in part on the rules associated with the loyalty rewards program.

9. The system of claim 8 wherein the operations further comprise generating a statement for the at least one loyalty provider comprising at least a portion of the line item data and the owed amount.

10. The system of claim 7 wherein the operations further comprise:
detecting a return associated with the transaction based on, at least in part, comparing the line item data with the stored data associated with the plurality of individuals;
retracting the at least one reward from each of the plurality of individuals based on, at least in part, the detecting of the return;
determining whether the owed amount is associated with the return; and
when determining that the owed amount is associated with the return:
refunding the owed amount when the owed amount has been paid; or
voiding the owed amount when the owed amount is unpaid.

11. The system of claim 1 wherein the operations further comprise generating a statement for the plurality of individuals, comprising components of the information associated with the first item.

12. The system of claim 11 wherein the statement further comprises information associated with the at least one reward for each of the plurality of individuals.

13. The system of claim 12 wherein the statement further comprises advertising information.

14. The system of claim 1 wherein the operations further comprise customizing the at least one promotion based on information associated with the plurality of individuals.

15. The system of claim 1 wherein the at least one promotion comprises two or more promotions.

16. The system of claim 1, wherein the system is an online system.

17. The system of claim 1, wherein the operations further comprise:
determining whether the plurality of individuals is eligible for the at least one promotion, based on demographic information of the plurality of individuals.

18. A computer-implemented method performed by at least one hardware processor, comprising:
acquiring, via an identification component in communication with the at least one hardware processor, identification information of a plurality of individuals and information of a transaction initiated by the plurality of individuals, the identification component comprising at least one of a magnetic card reader, a scanning device, a biometric input device, or a keyboard;
receiving, via an interface component in communication with the at least one hardware processor, user input for updating at least one of the identification information or rules associated with a loyalty rewards program;
provide, to the Internet-accessible user device, an authentication interface for accessing information associated with the loyalty rewards program;
identifying the plurality of individuals based on the identification information;
storing, in a storage device coupled to the at least one hardware processor, data descriptive of a first item purchased in the transaction in a line item format, the line item format comprising a stock keeping unit (SKU) indicating an identity of the first item, identities of the plurality of individuals, a tender used by each of the plurality of individuals, a payment amount made by each of the plurality of individuals, and at least one promotion related to the loyalty rewards program;
comparing the line item data with the rules associated with the loyalty rewards program;
determining whether the plurality of individuals are eligible for the at least one promotion, based at least
on the rules associated with the loyalty rewards program, and
on other transactions made by the plurality of individuals prior to the transaction;
determining whether the tender used by each of the plurality of individuals is eligible for the at least one promotion based on the rules associated with the loyalty rewards program;
determining, via the at least one hardware processor, an eligible amount associated with the transaction for each of the plurality of individuals, based at least on whether the plurality of individuals and the tenders used by the plurality of individuals are eligible for the at least one promotion;
determining at least one reward for each of the plurality of individuals, based on the comparing of the line item data with the rules, the determined eligible amounts, and the at least one promotion;
determining an owed amount associated with at least one loyalty provider based on the at least one promotion and the rewards; and
storing, in the storage device, information of each of the rewards and each owed amount as part of the line item data of the first item.

19. The computer-implemented method of claim 18 wherein determining at least one reward comprises calculating a reward amount for each of the plurality of individuals, based on the determined eligible amount, the at least one promotion, and the rules associated with the loyalty rewards program.

20. The computer-implemented method of claim 18, further comprising receiving, via a web-based interface, the user input for updating the at least one of the identification information or the rules associated with the loyalty rewards program.

21. The computer-implemented method of claim 18, further comprising:
determining whether the first item is eligible for the loyalty rewards program based on the rules associated with the loyalty rewards program; and
determining an eligible amount associated with the transaction eligible for each of the plurality of individuals is based at least in part on whether the first item is eligible for the at least one promotion.

22. The computer-implemented method of claim 18 further comprising retracting, via the at least one hardware processor, the at least one reward from each of the plurality of individuals, if a comparison of the line item data with stored data relating to the plurality of individuals determines a return of the purchase.

23. The computer-implemented method of claim 18 further comprising:
charging, via the at least one hardware processor, the at least one loyalty provider for the owed amount.

24. The computer-implemented method of claim 23 wherein the information associated with the first item comprises information associated with the at least one loyalty provider.

25. The computer-implemented method of claim 24 further comprising determining the owed amount based in part on the rules associated with the loyalty rewards program.

26. The computer-implemented method of claim 25, further comprising generating a statement for the at least one loyalty provider, comprising at least a portion of the line item data and the owed amount.

27. The computer-implemented method of claim 24 further comprising:
detecting a return associated with the transaction based on, at least in part, comparing the line item data with the stored data associated with the plurality of individuals;
retracting the at least one reward from each of the plurality of individuals, based on, at least in part, the detecting of the return;
determining whether the owed amount is associated with the return; and
when determining that the owed amount is associated with the return:
refunding the owed amount when the owed amount has already been paid; or
voiding the owed amount when the owed amount is unpaid.

28. The computer-implemented method of claim 18, further comprising generating a statement for the plurality of individuals comprising components of the information associated with the first item.

29. The computer-implemented method of claim 28 wherein the statement further comprises information associated with the at least one reward for each of the plurality of individuals.

30. The computer-implemented method of claim 28 wherein the statement further comprises advertising information.

31. The computer-implemented method of claim 18 further comprising customizing, via the at least one hardware processor, the at least one promotion based on stored information associated with the plurality of individuals.

32. The computer-implemented method of claim 18 wherein the at least one promotion comprises two or more promotions.

33. The computer-implemented method of claim 18, further comprising:
determining whether the plurality of individuals is eligible for the at least one promotion, based on demographic information of the plurality of individuals.

34. A non-transitory computer-readable medium comprising instructions which, when executed by at least one hardware processor, cause the at least one hardware processor to perform operations comprising:
acquiring, via an identification component in communication with the at least one hardware processor, identification information of a plurality of individuals and information of a transaction initiated by the plurality of individuals, the identification component comprising at least one of a magnetic card reader, a scanning device, a biometric input device, or a keyboard;
receiving, via an interface component in communication with the at least one hardware processor, user input for updating at least one of the identification information or rules associated with a loyalty rewards program;
provide, to the Internet-accessible user device, an authentication interface for accessing information associated with the loyalty rewards program;
identifying the plurality of individuals based on the identification information;
storing, in a storage device coupled to the at least one hardware processor, data descriptive of a first item purchased in the transaction in a line item format, the line item format comprising a stock keeping unit (SKU) indicating an identity of the first item, identities of the plurality of individuals, a tender used by each of the plurality of individuals, a payment amount made by each of the plurality of individuals, and at least one promotion related to the loyalty rewards program;
comparing the line item data with the rules associated with the loyalty rewards program;
determining whether the plurality of individuals are eligible for the at least one promotion, based at least
on the rules associated with the loyalty rewards program, and
on other transactions made by the plurality of individuals prior to the transaction;
determining whether the tender used by each of the plurality of individuals is eligible for the at least one promotion based on the rules associated with the loyalty rewards program;
determining, via the at least one hardware processor, an eligible amount associated with the transaction for each of the plurality of individuals, based at least on whether the plurality of individuals and the tenders used by the plurality of individuals are eligible for the at least one promotion;
determining at least one reward for each of the plurality of individuals, based on the comparing of the line item data with the rules, the determined eligible amounts, and the at least one promotion;
determining an owed amount associated with at least one loyalty provider based on the at least one promotion and the rewards; and
storing, in the storage device, information of each of the rewards and each owed amount as part of the line item data of the first item.

35. The non-transitory computer-readable medium of claim 34, wherein the operations further comprise:
determining whether the plurality of individuals is eligible for the at least one promotion, based on demographic information of the plurality of individuals.

* * * * *